(12) United States Patent
Shorrock et al.

(10) Patent No.: US 10,550,969 B2
(45) Date of Patent: Feb. 4, 2020

(54) CONNECTOR

(71) Applicant: Kutting UK Limited, Bedfordshire (GB)

(72) Inventors: Lee Peter Shorrock, Northamptonshire (GB); Kevin Johnson, Northamptonshire (GB); Peter Shorrock, Northamptonshire (GB)

(73) Assignee: KUTTING UK LIMITED, Bedfordshire (GB)

( * ) Notice: Subject to any disclaimer, the term of this patent is extended or adjusted under 35 U.S.C. 154(b) by 323 days.

(21) Appl. No.: 15/310,851

(22) PCT Filed: Feb. 16, 2015

(86) PCT No.: PCT/GB2015/000057
§ 371 (c)(1),
(2) Date: Nov. 14, 2016

(87) PCT Pub. No.: WO2015/185882
PCT Pub. Date: Dec. 10, 2015

(65) Prior Publication Data
US 2017/0082225 A1 Mar. 23, 2017

(30) Foreign Application Priority Data
Jun. 4, 2014 (GB) .................................. 1409922.0

(51) Int. Cl.
F16L 19/02 (2006.01)
F16L 1/26 (2006.01)
(Continued)

(52) U.S. Cl.
CPC ............. *F16L 19/0206* (2013.01); *F16L 1/26* (2013.01); *F16L 19/005* (2013.01); *F16L 19/025* (2013.01)

(58) Field of Classification Search
CPC ... F16L 19/005; F16L 19/025; F16L 19/0206; F16L 1/26
(Continued)

(56) References Cited

U.S. PATENT DOCUMENTS 2,585,453 A * 2/1952 Gallagher ..................... 285/341
3,233,924 A * 2/1966 Stanley ............... F16L 19/0206
285/332 X
(Continued)

FOREIGN PATENT DOCUMENTS

GB 819 421 9/1959
WO 2010/047573 4/2010

*Primary Examiner* — Zachary T Dragicevich
(74) *Attorney, Agent, or Firm* — Clark & Brody

(57) ABSTRACT

A connector has a cylindrical sleeve device having a first part, with an external screwthread on its outer side, and a second part, with an internal screwthread on its inner side. One of the screwthreads engages a corresponding screwthread on a further part when the device is in use. At least a portion of the said second part is yieldable. A locking part is provided with a screwthread which engages the other of the screwthreads of the cylindrical sleeve device when the connector is in use. The second part and the locking part have mutually engageable portions which, when the locking part is tightened relative to the cylindrical sleeve device, interengage to cause yielding of the second part or yieldable portion thereof. This effects locking of the cylindrical sleeve device with respect to such a further part when the connector is in use.

14 Claims, 14 Drawing Sheets

(51) Int. Cl.
*F16L 19/00* (2006.01)
*F16L 19/025* (2006.01)

(58) Field of Classification Search
USPC .................... 285/332, 341, 354, 386, 389
See application file for complete search history.

(56) References Cited

U.S. PATENT DOCUMENTS

| | | | |
|---|---|---|---|
| 4,659,116 A * | 4/1987 | Cameron | F16L 19/0206 |
| | | | 285/354 X |
| 5,857,716 A | 1/1999 | Thomas | |
| 9,897,238 B2 * | 2/2018 | Peirce | |
| 2007/0267869 A1 | 11/2007 | Patel | |
| 2008/0136175 A1 | 6/2008 | Hansen et al. | |
| 2008/0272590 A1 * | 11/2008 | Howard | 285/386 X |

* cited by examiner

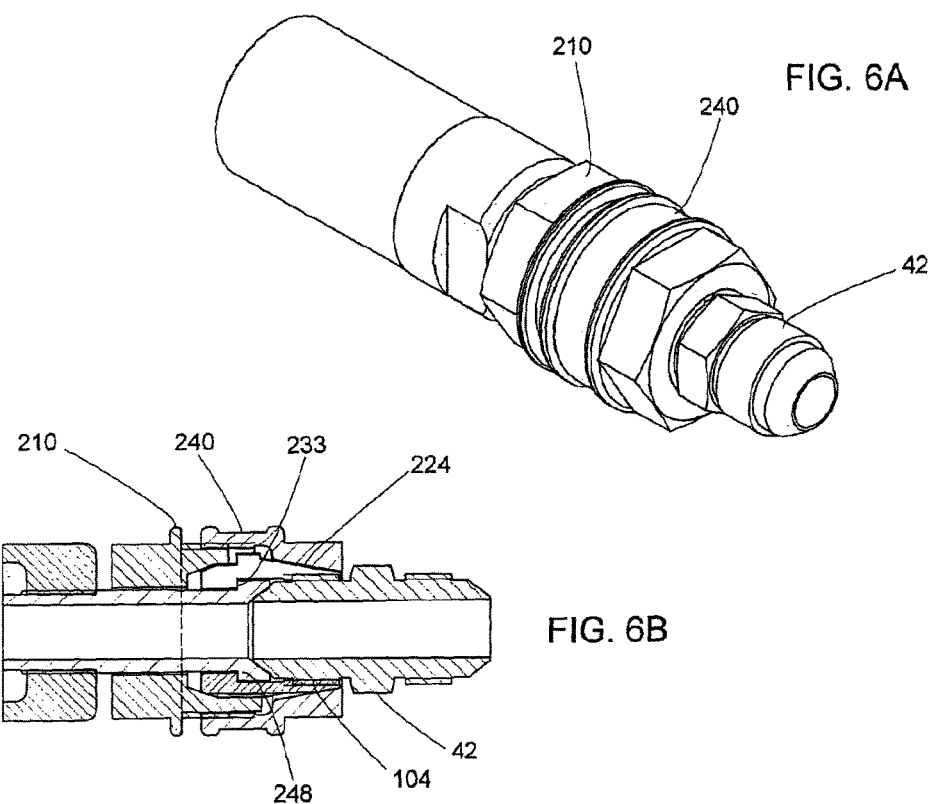
FIG. 6A
FIG. 6B
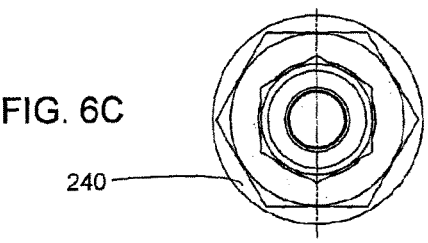
FIG. 6C
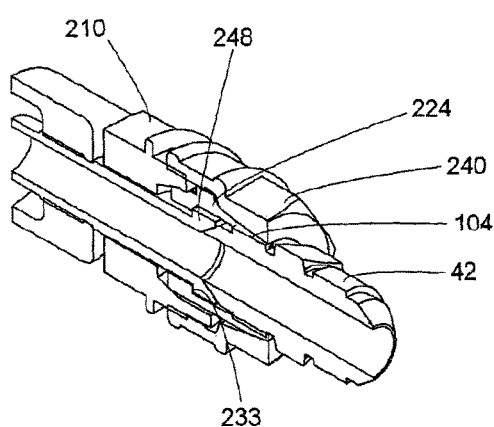
FIG. 6D

CONNECTOR

TECHNICAL FIELD

The present invention is directed to a connector especially but not exclusively for connecting subsea hose.

CROSS REFERNCE TO RELATED APPLICATIONS

This application is the National Stage of International Application PCT/GB2015/000057 filed Feb. 16, 2015, which claims the benefit of United Kingdom Patent Application No. 1409922.0 filed on 4 Jun. 2014, the specification of which is incorporated by reference.

BACKGROUND

Subsea hoses are subjected to a wide range of forces, especially flexural and rotational forces, as well as internal pressure and external pressure, during and after installation, for periods of 20 years or more. Once installed, it is desirable for subsea hoses to remain in situ for many years. Furthermore, it is desirable for connections between for example subsea hoses and stab connector boxes to be capable of maintaining a sealed connection under sustained and repeated such subsea forces. Such a seal is desirably to be maintained for many years in order to avoid costly repair or replacement work.

SUMMARY OF INVENTION

It is therefore an aim of the present invention to provide a connector for providing a sealed connection for a hose under subsea conditions, for example having JIC fittings, but also for other applications, such as for equipment on ships and pontoons, and other industrial applications, for example with respect to hydraulics, and British Standard Pipe fittings.

Accordingly, a first aspect of the present invention is directed to a connector comprising a cylindrical sleeve device having a first part, with an external screwthread on its outer side, and a second part, with an internal screwthread on its inner side, one of the screwthreads engaging a corresponding screwthread on a further part when the connector is in use, at least a portion of the said second part being yieldable, the connector further comprising a locking part provided with a screwthread which engages the other of the screwthreads of the cylindrical sleeve device when the connector is in use, the said second part and the locking part having mutually engageable portions which, when the locking part is tightened relative to the cylindrical sleeve device, interengage to cause yielding of the second part or yieldable portion thereof and so effect locking of the cylindrical sleeve device with respect to such a further part when the connector is in use.

The said first part and the said second part may be formed of a single integral component, or may be separable parts.

In use, yielding of the second part or a portion thereof provides a frictional engagement between the second part and the said such a further part, as well as causing a displacement of the screwthread of the second part relative to the screwthread of the said such further part, so that the screwthreaded engagement between the second part and the said such further part may become jammed and thus difficult to unscrew.

For example, in one embodiment of the present invention, the torque required to break the connection (sometimes referred to as the breakaway torque) was in excess of 100 Nm. This high breakaway torque requirement which is a result of the radial engagement of the further part by the second part is much greater than the torque which would be required to break the axial connection between a known example of a JIC fitting.

Of the pair of screwthreads of the first part and the locking part on the one hand, and the pair of screwthreads of the second part and the said further part on the other hand, one of those pairs is "left-handed" and the other of those pairs is "right-handed", although convention dictates that it is the pair of screwthreads of the second part and the said further part that are "right-handed". Such an arrangement of opposing screwthreads assists the jamming between the second part and the further part, especially because during a final tightening of the locking part with respect to the first part, a user may inadvertently apply contra-rotation to the further part. Such an arrangement of opposing screwthreads reduces the likelihood of any inadvertent contra-rotation, because tightening of the locking part and the first part operates in the same sense as would further tighten the second part with respect to the further part of the cylindrical sleeve device.

The second part may be provided with one or more slots. The slot or slots enable the second part or a portion thereof to be yieldable.

The slot or slots may be through-slots so that they extend through the full thickness of the material in which it is or they are provided.

The said one or more slots may be substantially parallel to an axis of the second part.

The said one or more slots may be substantially perpendicular to an axis of the second part.

The said one or more slots may be closed or may be open at one end. In an embodiment in which the said first and second parts are separable, there may be one slot provided along substantially the full length of the second part.

The said one or more slots may have one or more stress widening or stress holes.

A stress widening or stress hole is intended to mitigate the effects of stress and strain, reducing the risk of cracking of the material.

If present, a stress widening or stress hole may be at an end of a slot or located along the length of the slot.

If there is more than one slot, the slots may be distributed substantially uniformly circumferentially.

The said one or more slots may be located in a region at a front end of the second part, the front end being the end of the second part in closest proximity with the said such a further part when the connector is in use.

Thus, in an embodiment in which the said first and second parts are separable, a single slot may be provided along substantially the full length of the second part substantially parallel to the axis thereof. This arrangement enables substantially the whole of the second part to be yieldable, thus providing a large surface area for frictional engagement between the second part and the said such a further part.

In an embodiment in which the cylindrical sleeve device is formed of separable parts, the parts may be provided with mutually engageable portions such castellations or corresponding tongue and indented portions or flats. Such engageable portions enable a rotational force applied to one of the separable parts to be transmitted to other of the separable parts. The engageable portions may be provided such that there is a degree of "play" to accommodate deformation of any of the separable parts which may occur in use, for example as a result of tightening of any screwthreads of the connector.

The first part may have three tongues, and the second part may have three corresponding indents or flats.

In a preferred arrangement, the second part is provided with an indent diametrically or at least approximately diametrically opposite the single slot, and two flats on respective portions of the said second part which are respectively on opposite sides of the single slot, preferably with the indent and the two flats being generally equiangularly spaced around the circumference of the said second part. The indent may be approximately equal in width to the tongue which engages it, and the flats may be somewhat wider, so as to provide a degree of "play" as described above.

The separable parts of the cylindrical sleeve device may be provided with respective corresponding tapered surfaces, to aid a sealed connection between such parts.

In an embodiment where the cylindrical sleeve device is formed of a single integral component, mutually engageable portions of the second part of the cylindrical sleeve device and of the locking part may, when the locking part is tightened relative to the cylindrical sleeve device, interengage to cause displacement of the yieldable portion and so effect both locking of the locking part with respect to the cylindrical sleeve device and locking of the cylindrical sleeve device with respect to the said such further part when the connector is in use.

The second part may be provided with a tapered surface in the region of its end furthest from the said first part. Such a tapered surface at that end of the second part may correspond to a tapered surface of a corresponding region of the locking part, so that when the locking part is tightened in use, the corresponding tapered surfaces exert a radial force on each other, causing yielding of the second part or a yieldable portion thereof, and also effect locking of the locking part with respect to the cylindrical sleeve device.

The angle of tapering of these corresponding tapered surfaces may be shallow, for example the tapered surface may be in the range of approximately 15° to 25°, preferably approximately 20°, to an axis of the respective part. A shallow tapering angle aids the formation of a frictional lock between corresponding surfaces of the locking part and the cylindrical sleeve device, and also urges the parts together, thus further improving the locking and sealing of the connector.

The second part may be provided with a further tapered or chamfered surface in the region of its end nearest the first part, the surface corresponding to a corresponding tapered surface provided on the first part which abuts the said further tapered or chamfered surface when in use. The angle of incline relative to the common axis of the first and second parts of these abutting surfaces may be relatively high in comparison with the tapering of the engaging surfaces of the second part and the locking part. Such a relatively steep tapering or chamfering, in a range of approximately 30° to 50°, preferably 40°, to the common axis, assists the formation of an axial lock between the first and second parts.

The said shallow tapering of engaging surfaces of the second part and the locking part, and the said steeper tapering or chamfering of abutting surfaces of the second part and the first part, act synergistically to aid the transmittal of a rotational force applied to the locking part into a radial compression of the second part, thus causing the second part or yieldable portion thereof to yield, as well as creating an axial compression of the first and second parts. Such a synergistic action forms a tight mechanical seal under a tightening rotation of the locking part.

The engageable portion of the second part, being one of the said mutually engageable portions, may be in the form of a step.

That end of the cylindrical sleeve device furthest from the said second part may be provided with a portion with an external surface suitable for engagement with a tool, for example a spanner. For this purpose, that portion may have a hexagonal cross-section.

The first part may be provided with a flanged portion.

The locking part may be in the form of a ring or a hollow cylindrical portion.

The locking part may have a screwthread on its inner surface in at least a first region, which corresponds to a screwthread on the outer surface of the first part of the cylindrical sleeve device.

The locking part may be provided with an inwardly directed lip or shoulder.

The lip or shoulder may constitute the engagement portion of the locking part.

The outer surface of the locking part may be indented for engagement by a tool such as a C spanner.

The cylindrical sleeve device and/or the locking part may comprise metal, for example stainless steel, which may be stainless steel 316, super duplex stainless steel, 6Mo stainless steel, Inconel™ stainless steel, Hastelloy™, or nickel-chromium stainless steel.

A second aspect of the present invention is directed to a connection assembly comprising two parts with respective interengaging portions which inhibit movement between the parts away from one another along an axis of the assembly, and a collar which is in screwthreaded engagement with one of the parts, a first locking portion, being a portion of the collar, engaging a second locking portion, being a portion of the other of the parts, upon rotation of the said collar relative to said one of the parts about the axis of the screwthreaded engagement therebetween when the assembly is in use, at least one of the locking portions being provided with a surface which is on a slant relative to the axis of the assembly.

Both locking portions may be provided with a surface which is on a slant relative to the axis of the assembly.

One of the two parts may be provided with a ring. The ring may constitute the locking portion for that part.

At least one of the locking portions may have at least one slot extending in an axial direction.

The slots may be closed at one end.

The collar may have a multiplicity of such slots. Those slots may be uniformly spaced around the collar.

At least one of the constituent parts of the connection assembly may comprise metal, for example stainless steel, which may be stainless steel 316, super duplex stainless steel, 6Mo stainless steel, Inconel™ stainless steel, Hastelloy™, or nickel-chromium stainless steel.

Examples of a connector embodying the first aspect of the present invention will now be described in greater detail with reference to the accompanying drawings, in which:

BRIEF DESCRIPTION OF THE DRAWINGS

FIGS. 6A, 6B, 6C, and 6D show respectively perspective, axial sectional, end and perspective axial sectional views of a connector embodying the first aspect of the present invention, in registration with a further part.

DETAILED DESCRIPTION OF THE INVENTION

Figure 1A:
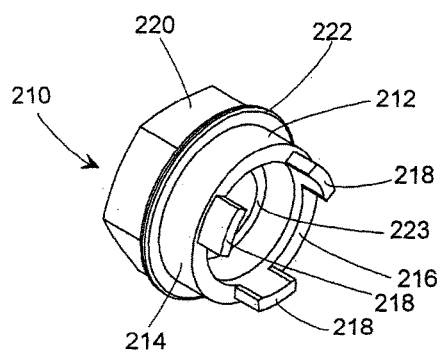
FIGS. 1A, 1B, 1C, and 1D show respectively a perspective, axial sectional, side and end view of a first part of a cylindrical sleeve device of a connector embodying the first aspect of the present invention.
Figure 1B:
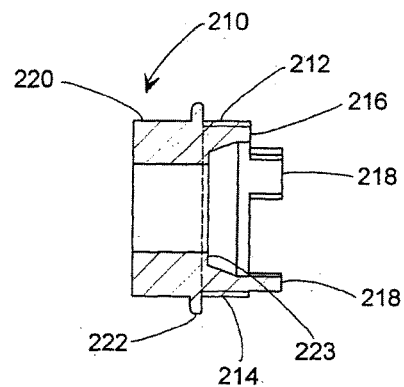
Figure 1C:
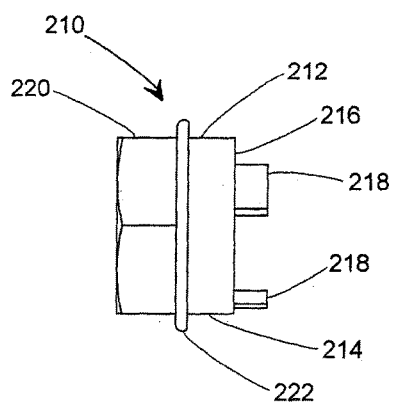
Figure 1D:
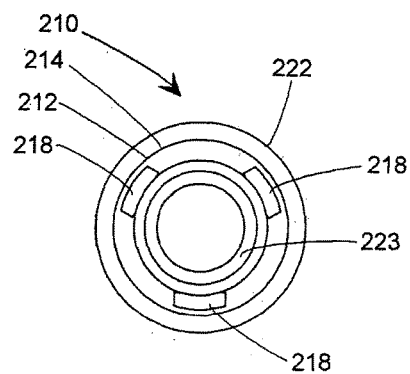
Figure 2A:
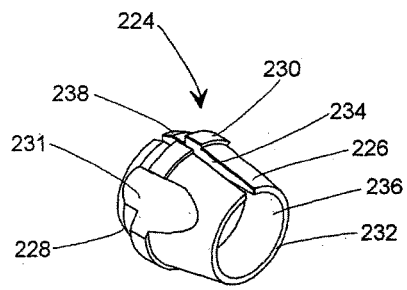
FIGS. 2A, 2B, 2C, and 2D show corresponding views of a second part of the cylindrical sleeve device of a connector embodying the first aspect of the present invention.
Figure 2B:
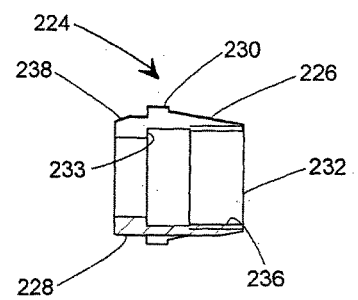
Figure 2C:
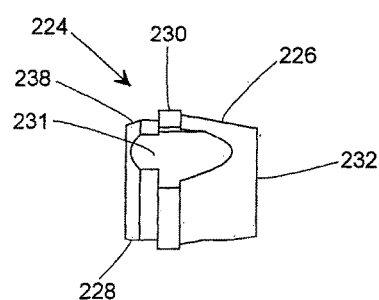
Figure 2D:
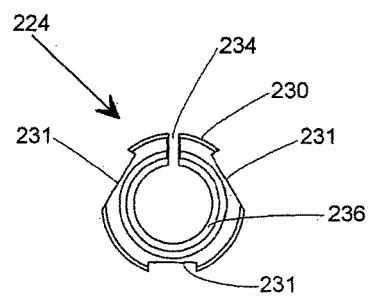

In the detailed description below, some features described may not appear or be labelled in every drawing, for the purpose of clarity, but the context of the description will enable the skilled person to identify when a feature is present but which is not shown in a particular Figure, or which is shown but not explicitly labelled.

FIGS. 1A, 1B, 1C, and 1D show a tubular or hollow cylindrical first part 210 of a cylindrical sleeve device of a connector, the first part 210 having a region 212 having a screwthread 214 formed on an external surface. Protruding parallel to an axis of the first part 210 from a front end 216 of the first part 210 are three substantially equiangularly spaced tongues 218. At a rear end 220 of the first part 210 the external surface is hexagonal. The region 212 has a screwthread 214 on its external surface. Between the region 212 and the rear end 220 there is a flanged portion 222 of slightly larger diameter than that of the region 212 and that of the rear end 220. A lip or shoulder 223 is provided on the inside of the first part 210.

FIGS. 2A, 2B, 2C, and 2D show a tubular second part 224 having a front region 226 and a rear region 228, the front region 226 meeting the rear region 228 at a flanged region 230. The front region 226 has an external surface which is tapered at substantially 20° in a forward direction along and relative to the axis of the second part 224. The flanged region 230, and parts of the front region 226 and the rear region 228, is provided with one indent 231 diametrically opposite a slot 234, and two flats 231 on respective portions of the second part 224 on opposite sides of the slot 234, which correspond to the tongues 218 of the first part 210. Parallel to the axis of the second part 224 and along the full length thereof is provided a through-slot 234, open at both ends of the second part 224. Thus, the depth of the slot 234 is the full thickness of the material in which it is provided. In use, the slot 234 allows yielding of the material of the second part 224 so that the width of the slot 234 is reduced.

In the end view 2D, it is evident that the angle about the axis of the part 224 between the slot 234 and one of the flats 231 is substantially equal to the angle between the slot 234 and the other flat 231. Also, the indent and the two flats 231 are substantially equiangularly spaced about the axis of the second part 224, that is to say at an angle of substantially 120° relative to each other.

At least part of an inner surface 236 of the front region 226 of the second part 224 is provided with a screwthread. The rear region 228 is provided with a tapering or chamfering 238 on its outer surface at substantially 40° in a rearward direction along and relative to the axis of the second part 224. On its inner surface in the rear region 228, the second part 224 is provided with a shoulder 233 for engagement with a corresponding end of a hose fitting.

The front and rear tapering of the second part 224 aid the transmittal of a rotational force applied to a locking part 240 into a radial compression of the second part 224, in use.

Figure 3A:
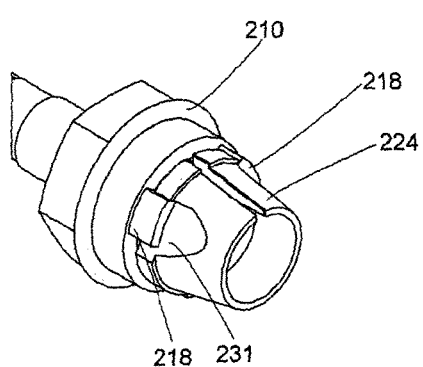
FIGS. 3A, 3B, and 3C show respectively perspective, side and end views of the first part and the second part shown in FIGS. 1 and 2, in registration with each other.
Figure 3B:
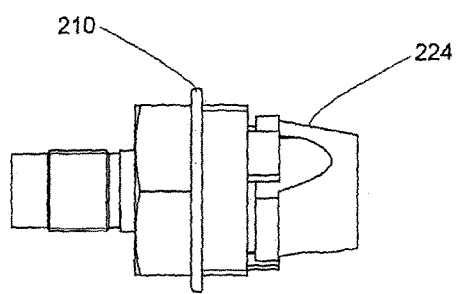
Figure 3C:
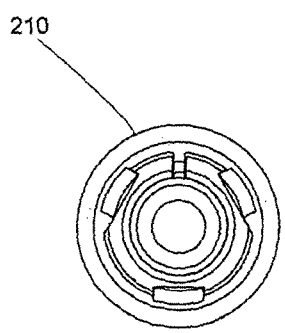
Figure 4A:
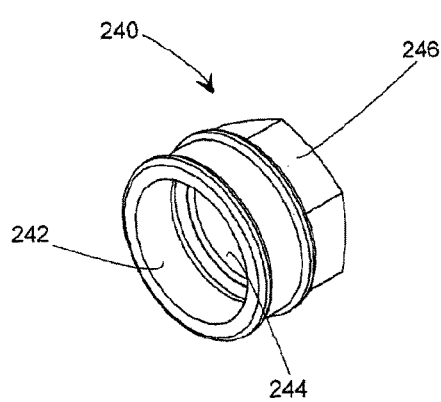
FIGS. 4A, 4B, 4C, 4D, and 4E show respectively a perspective view from one end, one axial sectional view, a side view, another end view and a perspective view from the other end of a locking part of a connector embodying the first aspect of the present invention.
Figure 4B:
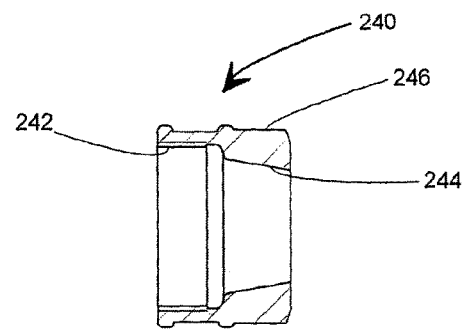
Figure 4C:
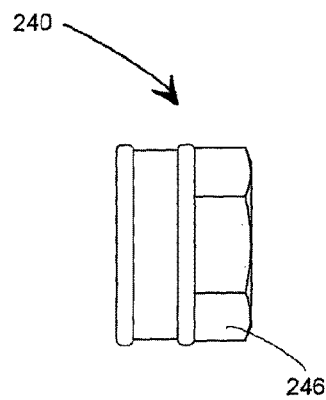
Figure 4D:
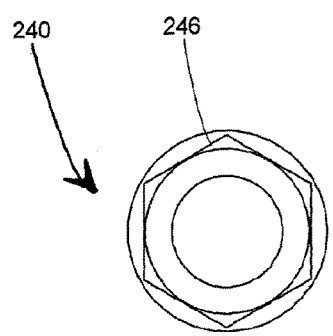
Figure 4E:
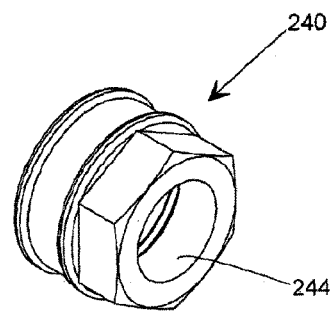
Figure 5A:
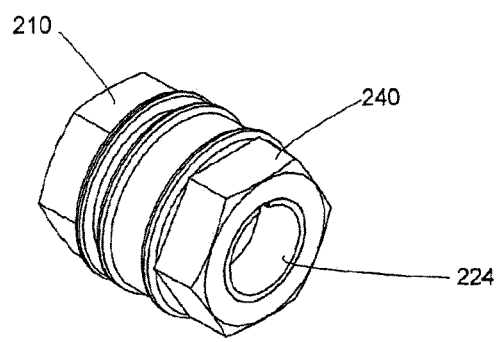
FIGS. 5A, 5B, 5C, 5D, 5E, and 5F show respectively perspective, axial sectional, side, one end, perspective axial sectional, and other end views of the cylindrical sleeve device shown in FIG. 3 in registration with the locking part shown in FIG. 4, each being components of a connector embodying the first aspect of the present invention.
Figure 5B:
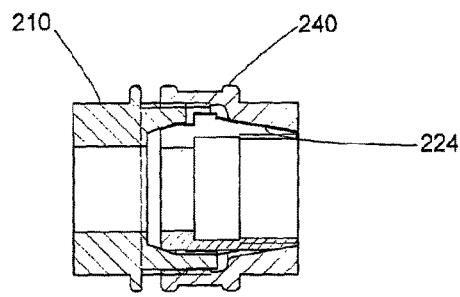
Figure 5C:
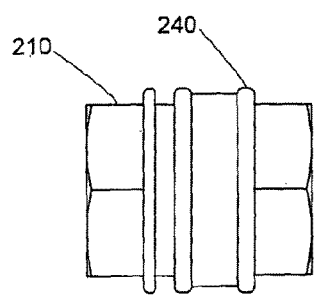
Figure 5D:
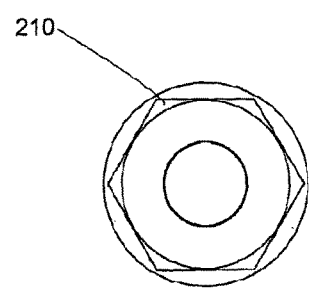
Figure 5E:
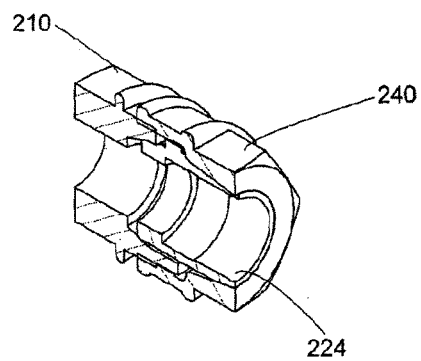
Figure 5F:
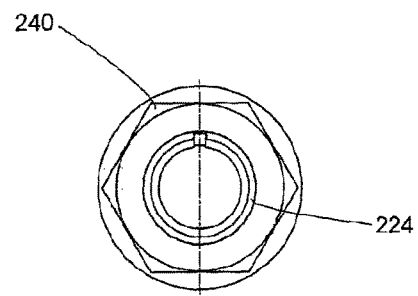

FIGS. 3A, 3B, and 3C show the first part 210 and the second part 224 in registration with each other so that they are coupled in axial alignment. The outer end of the chamfered portion 238 of the rear region 228 of the second part 224 abuts the lip or shoulder 223 of the first part 210, and the tongues 218 of the first part 210 are in registration with and are received by the indents or flats 231 of the second part 224.

FIGS. 4A, 4B, 4C, 4D, and 4E show a locking part 240. The locking part 240 has an internal surface with a first region on which is formed a screwthread 242, and a second region 244 the interior of which is tapered in a forward direction along the axis of the locking part 240. The screwthread 242 of the first region and the tapered second region 244 are formed so that in use the screwthread 242 engages with the screwthread 214 of the first part 210 of the cylindrical sleeve device and the tapered region 244 engages with the tapered external surface of the front region 226 of the second part 224 of the cylindrical sleeve device. A further portion 246 of the external surface of the locking part 240 is provided with a hexagonal cross-section.

FIGS. 5A, 5B, 5C, 5B, 5E, and 5F show the first part 210 and the second part 224 of the cylindrical sleeve device in registration with each other, and in registration with the locking part 240.

FIGS. 6A, 6B, 6C, and 6D show a connector assembled and connected as it would be in use. The first part 210 and the second part 224 of the cylindrical sleeve device are in registration with each other, locked by the locking part 240. A further part 42 with a screwthread on an outer surface 104 is in screwthreaded engagement with the screwthread on the inner surface 236 of the front region 226 of the second part 224 of the cylindrical sleeve device 10. The second part 224 has yielded as a result of its engagement with the locking part 240, so that the slot 234 has been reduced in width. Thus, the screwthreaded engagement between the second part 224 and the further part 42 is jammed, and these two parts are locked together. Consequently, an end of a hose fitting 248 is held between the further part 42 and the shoulder 233 on the inner surface of the second part 240, so that such an end 248 of a hose fitting and the further part 42 are locked together in a sealed relationship.

Of the pair of screwthreads of the first part 220 and the locking 240 on the one hand, and the pair of screwthreads of the second part 224 and the said further part 42 on the other hand, one of those pairs is "left-handed" and the other of those pairs is "right-handed", although convention dictates that it is the pair of screwthreads of the second part 224 and the said further part 42 that are "right-handed".

Figure 7:
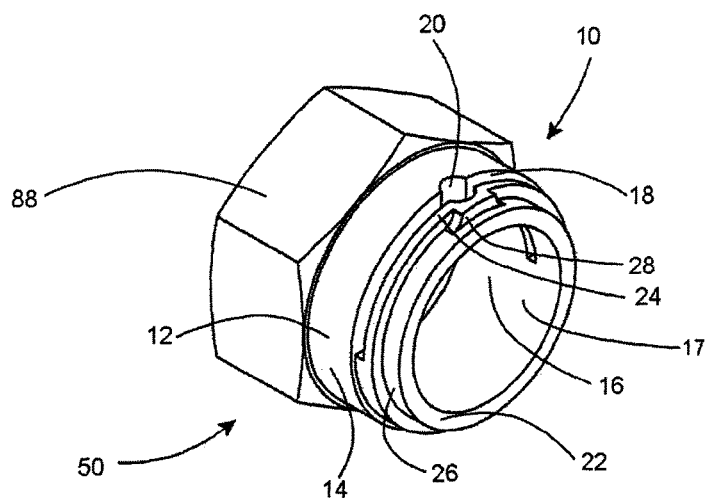
FIG. 7 shows a perspective view from one end of a cylindrical sleeve device of a connector embodying the first aspect of the present invention.
Figure 8:
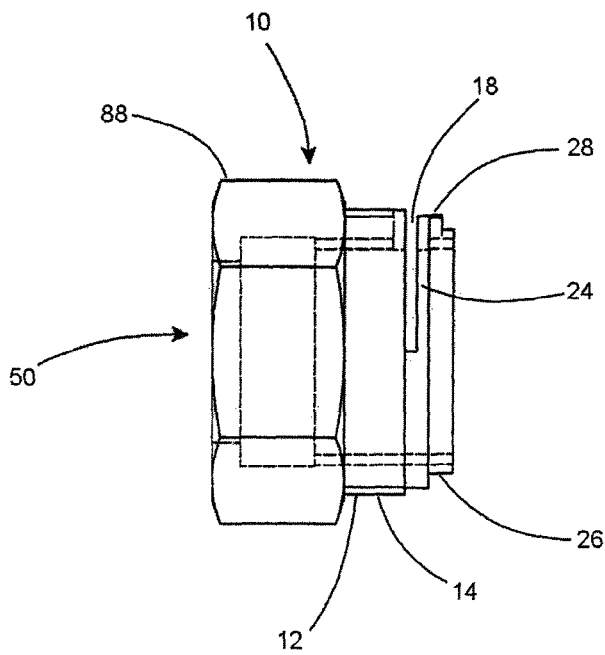
FIG. 8 shows a side view of the cylindrical sleeve device of FIG. 7.

FIGS. 7 and 8 show a cylindrical sleeve 10 of a connector, the sleeve 10 having a circular external cross section and having a region 12, constituting a first part of the sleeve 10 having an outer surface 14 and an inner surface 16, with a screwthread formed on both surfaces 14 and 16. A further region 17 of the sleeve 10, constituting a second part of the sleeve 10, has a slot 18 perpendicular to the axis of the sleeve 10. The slot 18 is widened halfway along its length. Thus the first and second parts of the sleeve 10 are parts of a single integral component. The widening 20 is in generally circular form and constitutes a stress widening. The slot 18 is located close to a front rim 22 of the sleeve 10, leaving only a relatively small region of the sleeve 10 between the slot 18 and the front rim 22 of the sleeve 10. The region between the slot 18 and the front rim 22 of the sleeve 10 includes a yieldable portion 24, which can be displaced when a sufficient axial force is exerted on it.

The region which includes the yieldable portion 24 itself comprises two regions of different external cross-sectional diameter with the region 26 of smaller diameter being closer to the rim 22. At the transition between the regions of differing diameter, there is an engagement portion in the form of a step 28. The step 28 is aligned with the widening 20.

In the region of a rear end 50 of the cylindrical sleeve 10 there is a portion 88 of the cylindrical sleeve 10 having a hexagonal cross-section, which may be suitable for engagement with a tool such as a spanner (not shown).

Figure 9:
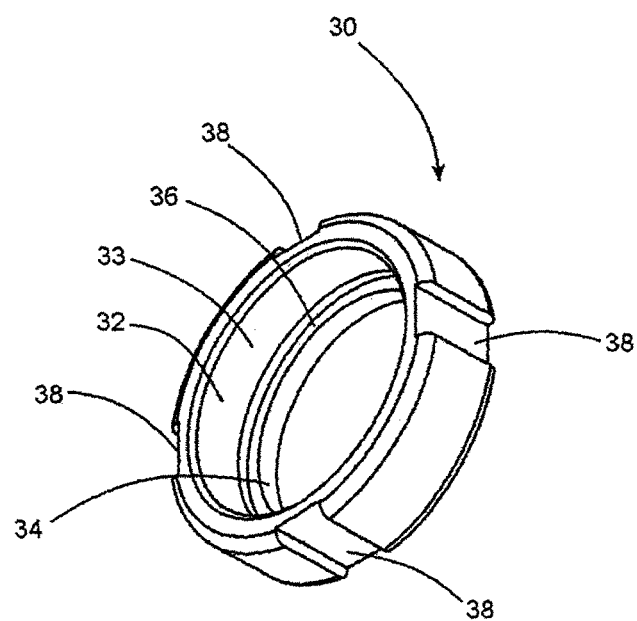
FIG. 9 shows a perspective view from one side of a locking part of a connector embodying the first aspect of the present invention.

FIG. 9 shows a locking part in the form of a hollow cylindrical portion or ring 30 which co-operates with the cylindrical sleeve shown in FIGS. 7 and 8. The ring 30 has a first region 32 with a first internal diameter and a second region 34 with a second internal diameter which is smaller than the first. The first region 32 has an internal diameter and a screwthread 33 on its inner surface which correspond to the diameter and screwthread on the surface 14 of the cylindrical sleeve 10. The second region 34 has an internal diameter at least as large as the smaller external diameter of the region which includes the yieldable portion 24 of the cylindrical sleeve 10. The transition between the first internal diameter and the second internal diameter of the ring 30 forms a surface 36 which is perpendicular to the axis of the ring 30, that perpendicular surface 36 forming an abutment surface which engages with the engagement portion 28 of the cylindrical sleeve 10 when the connector is in use. The outer surface of the ring is formed with indents 38 in its outer surface for engagement with a suitable tool (not shown).

It will be appreciated that the locking part 30 is shown in FIG. 9 oriented so that its internal features can be seen clearly. In use with the cylindrical sleeve 10 of FIGS. 7 and 8, the locking part 30 will be oriented so that its axis is co-linear with the axis of the sleeve 10 with the region 32 closer to the back end of the sleeve 10 than the region 34, once the locking part has been placed on to the cylindrical sleeve 10.

Figure 10:
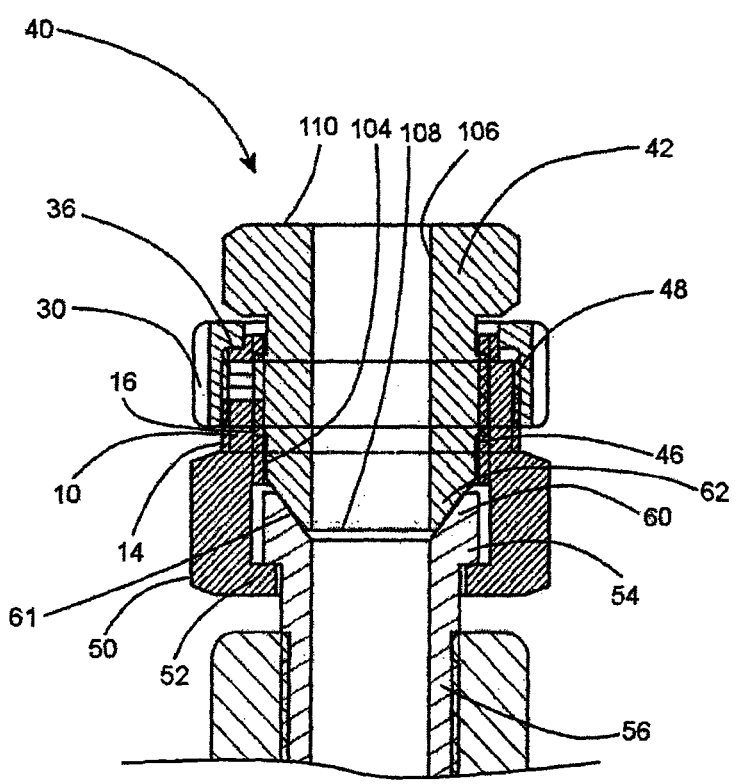
FIG. 10 shows an axial sectional view of a connector embodying the first aspect of the present invention.

FIG. 10 shows a connector 40 comprising an assembly of a cylindrical sleeve 10 as shown in FIGS. 7 and 8, a further part 42 and a ring 30 as shown in FIG. 9. The screwthread on the outer surface 14 of the cylindrical sleeve 10 engages with the screwthread 33 on the inner surface of the region 32 of the locking ring 30. Of the pair of screwthreads of the sleeve 10 and the locking ring 30 on the one hand, and the pair of screwthreads of the sleeve 10 and the said such further part 42 on the other hand, one of those pairs is "left-handed" and the other of those pairs is "right-handed", although convention dictates that it is the pair of screwthreads of the sleeve 10 and the said such further part 42 that are "right-handed". The respective axes of all three screwthreads, being the screwthread on the inner surface 16 of the sleeve 10, the screwthread on the outer surface of the sleeve 10, and the screwthread 33, are co-linear.

The said such further part 42 comprises a tubular portion with an outer surface 104 and an inner surface 106 and front 108 and rear 110 end portions. The said such further part 42 has a screwthread on its outer surface 104 for engagement with the internal screwthread on the inner surface 16 of the sleeve 10. The screwthread on the outer surface 104 of the said such further part is co-linear with the screwthreads of the sleeve 10 and locking ring 30. The rear portion 110 has a hexagonal cross-section for engagement with a suitable tool such as a spanner (not shown).

The step 28 (shown in FIG. 7 but not in FIG. 10) engages with the surface 36 of the locking ring 30 when the latter is tightened relative to the cylindrical sleeve 10. As the ring 30 is tightened (by a suitable tool), the surface 36 engages the step 28 so that the yieldable portion 24 of the cylindrical sleeve 10 yields. The yielding of the yieldable portion 24 displaces a section of the screwthread on the inner surface 16 of the cylindrical sleeve 10 so that it no longer corresponds with the screwthread precisely to the outer surface 46 of the said such further part 42. The displacement causes a jamming of the engaging screwthreads of the sleeve 10 and the said such further part 42, which in turn makes it very difficult for the said such further part 42 to be unscrewed from the cylindrical sleeve 10 while the locking part 30 is in place, and so the said such further part 42 is substantially locked in position relative to the cylindrical sleeve 10. In this way the sleeve 10 acts as a device which effects a locking action.

As the locking ring 30 is tightened with respect to the sleeve 10, the step 28 urges itself against the surface of the ring 30, tending to jam the screwthreaded engagement between the ring 30 and the sleeve 10, so that it is unlikely that the locking part 30 will become unscrewed from the sleeve 10 in service.

The skilled reader will appreciate that the method steps described above will be more or less applicable to each particular construction of the first aspect of the present invention.

The cylindrical sleeve 10 has a rear end 50 which has an inwardly oriented annular flange 52 for engagement with a corresponding flanged portion 54 of a tubular part 56.

The end of the tube 56 has a mouth 60 which has an internal surface 61 which is flared in a manner which corresponds to a slanted outer surface of a portion 62 at an end of the said such further part 42, forming a sealing connection between the tube 56 and the said such further part 42, enabling the passage of fluid between the tube 56 and the said such further part 42.

Figure 11:
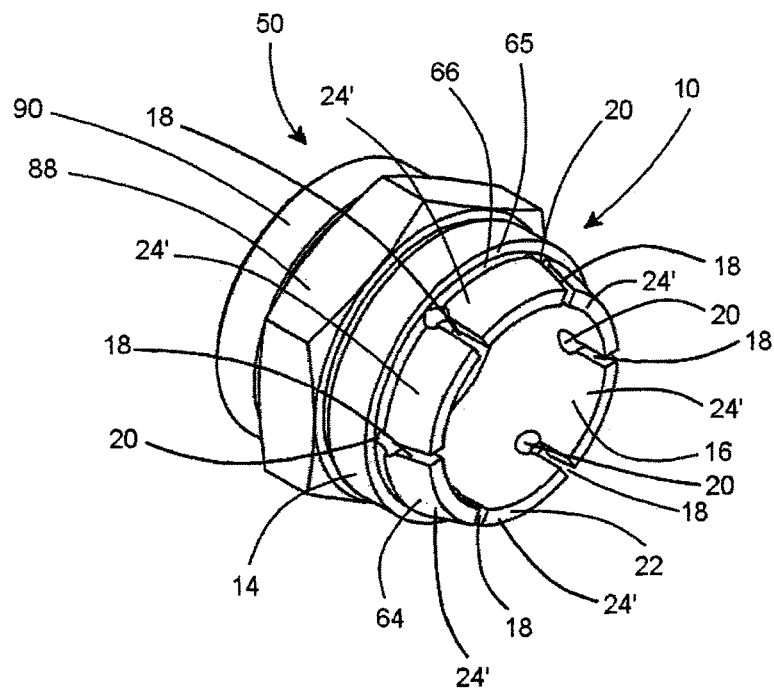
FIG. 11 shows a perspective view from one end of an alternative construction of a cylindrical sleeve device of a connector embodying the first aspect of the present invention.
Figure 12:
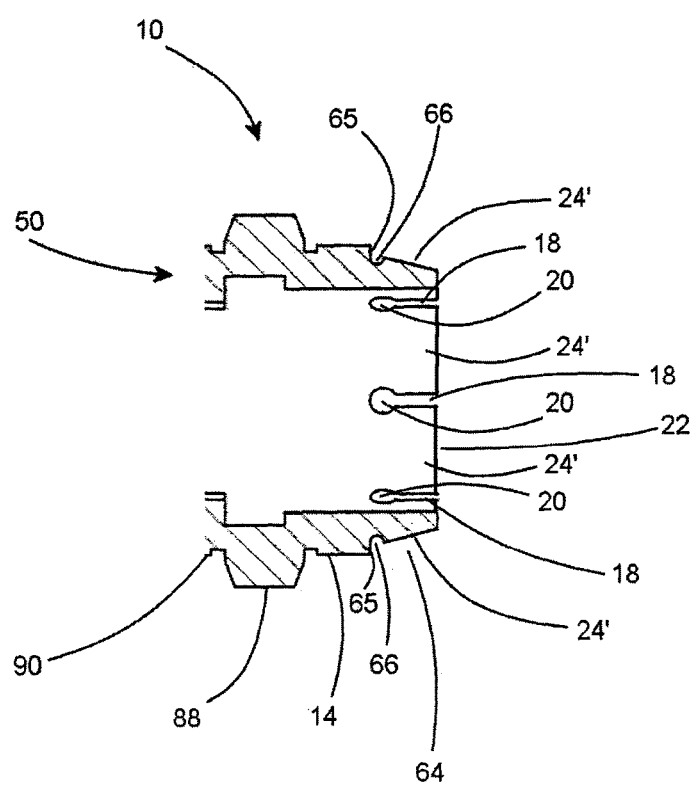
FIG. 12 shows part of an axial sectional view of the cylindrical sleeve device of FIG. 11.

An alternative construction of the cylindrical sleeve 10 is shown in FIGS. 11 and 12, in which the cylindrical sleeve 10 is of circular cross-section and has a region 14, constituting a first part of the sleeve 10, with an internal surface 16 and an outer surface 14, with respective screwthreads formed in the surfaces 14 and 16. The sleeve 10 also has a region 64, constituting a second part of the sleeve 10, terminating in a rim 22 of the cylindrical sleeve 10 is tapered and in this tapered region 64 there are several slots 18 extending generally parallel to the axis of the cylindrical sleeve 10. Thus the first and second parts of the sleeve 10 are parts of a single integral component. A step 65 is provided between the surface 14 and the region 64. At an inner end of each slot 18, furthest away from the rim 22 of the sleeve 10, there is a stress hole 20. There is a circumferential annular channel 66 around the outside of the sleeve 10 in registration with the holes 20. This channel 66 reduces the thickness of the material of the cylindrical sleeve 10. The slots 18 and the circumferential channel 66 result in engagement portions 24' between the slots 18 being yieldable. The stress holes 20 and the circumferential channel 66 are intended to mitigate the strain on the material of the sleeve 10 under the stress on the yieldable portions 24 exerted by the radial force exerted by a locking portion to be described hereinafter.

In the region of a rear end 50 of the cylindrical sleeve 10 there is a portion 88 of the cylindrical sleeve 10 having an external surface of hexagonal cross-section, which may be suitable for engagement with a tool such as a spanner (not shown). Beyond this portion 88 there is a further portion 90 having an external surface of circular cross-section.

Figure 13:
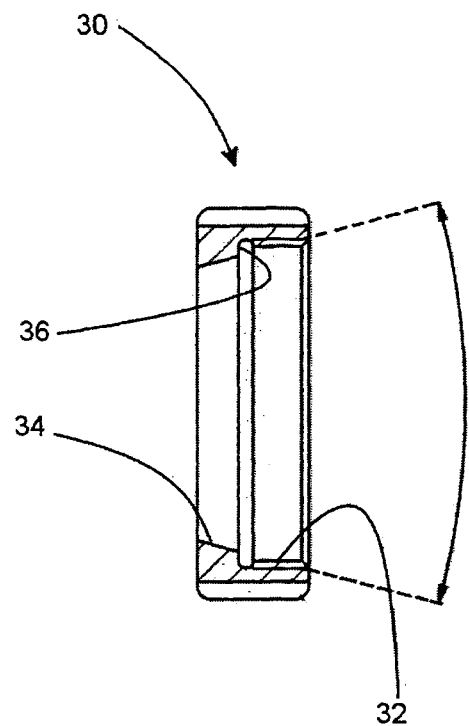
FIG. 13 shows an axial section of a locking part of a connector embodying the first aspect of the present invention.

FIG. 13 shows an axial section of a ring 30 for use with the cylindrical sleeve shown in FIGS. 11 and 12. The ring 30 has a first region 32 with an internal diameter of uniform cross-section and a second region 34 with a tapering internal surface, in a direction away from the region 32. The first region 32 has an internal diameter and a screwthread on its inner surface which correspond to the external diameter and external screwthread of the outer surface 14 of the cylindrical sleeve 10. The second region 34 has an internal diameter which at its largest is smaller than the external diameter of the surface 14, and at least as large as the external diameter of the rim 22 of the cylindrical sleeve 10. At the transition between the internal diameter of the portion 32 and the tapering internal diameter of the portion 34 there is a surface 36 which forms a limit surface which may abut the step 65.

The outer surface of the ring 30 shown in FIG. 13 has indents 38 in its outer surface for engagement with a suitable tool (not shown).

The screwthread of portion 32 of the ring 30 can engage with the screwthread of the outer surface 14 of the sleeve 10 shown in FIGS. 11 and 12, and when the ring 30 is tightened the tapered portion 34 engages with the outer surface of the engagement portions 24' of the sleeve 10, causing the engagement portions 24' to yield inwardly. The screwthread of the internal surface 16 of the sleeve 10 is thereby displaced, jamming a screwthreaded engagement between the sleeve 10 and a further part 42 engaged with the sleeve 10 when the latter is in use. In this way the sleeve 10 acts as a device which effects a locking action.

Figure 14:
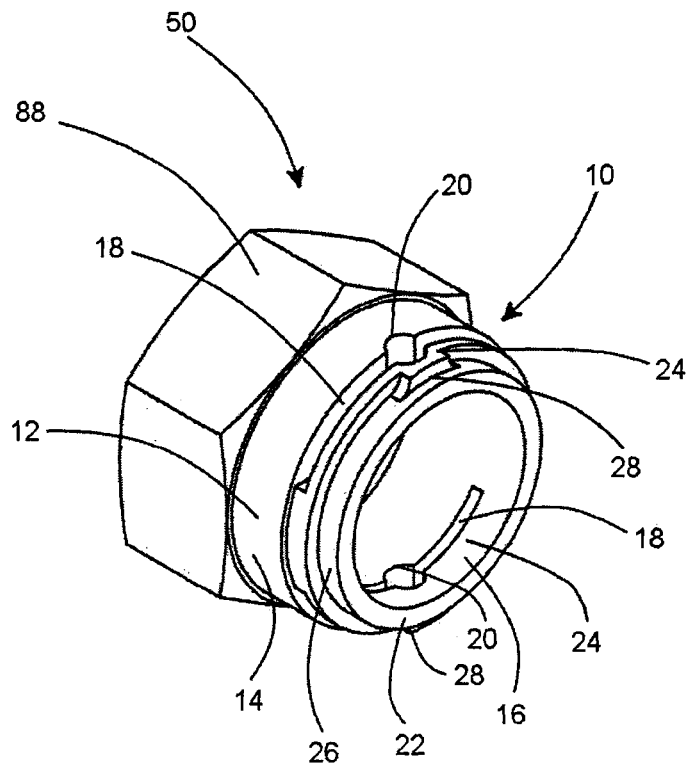
FIG. 14 shows a perspective view from one end of a further construction of a cylindrical sleeve device of a connector embodying the first aspect of the present invention.

FIG. 14 shows a yet further construction for the cylindrical sleeve 10 for a connector embodying the first aspect of the present invention. In this construction, the cylindrical sleeve 10 has two diametrically oppositely located slots 18, each one being of the same form as the slot 18 described with reference to FIG. 7.

The cylindrical sleeve construction shown in FIG. 14 may be used with a locking part 30 as described with reference to FIG. 9.

Figure 15:
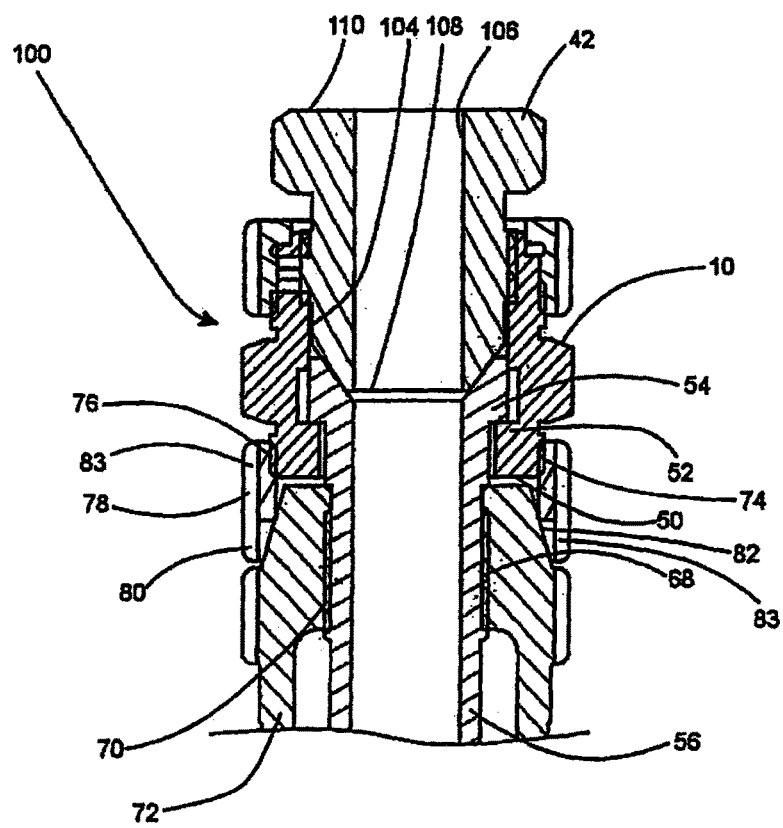
FIG. 15 shows an axial sectional view of a connection assembly embodying the second aspect of the present invention.

Turning now to FIG. 15, a connection assembly 100 has a tube 56 which has an externally flanged portion 54 which is engaged with an internally flanged portion 52 of a back end 50 of a cylindrical sleeve 10. The flanged portions 52 and 54 inhibit movement of the tube 56 and the cylindrical sleeve 10 away from one another along an axis of the assembly 100. The tube 56 has a screwthread on its outer surface 68, in at least a region of the tube 56 near the back end 50 of the cylindrical sleeve 10. The screwthread on the outer surface 68 of the first tube 56 corresponds to a screwthread on an inner surface 70 of an outer tube 72. A portion of the cylindrical sleeve 10 near its rear end 50 has a screwthread on its outer surface 74 which corresponds to a screwthread on an inner surface 76 of a first portion of a collar 78. The collar 78 has a second portion 80. An end of the inner surface 76 engages a corresponding slanted outer surface 82 of the outer tube 72. The surface is slanted relative to the longitudinal axis of the connection assembly 100.

The second portion of the collar 78 has slots (not shown) which enable the second portion 80 of the collar 78 to be resiliently deformable under the exertion of a force between the collar 78 and the third tube 72.

The collar 78 has indents 83 in its outer surface for engagement with a suitable tool (not shown). In use, the outer tube 72 is screwed on to the tube 56 to create a single part comprising the outer tube 72 and the tube 56. Subsequently, the collar 78 is turned so that with engagement between the internal screwthread thereof and the external screwthread of the sleeve 10 the collar 78 moves axially in the direction away from the rear end 50 of the cylindrical sleeve 10 towards the outer tube 72. As the collar 78 is thus turned, the end of the inner surface 76 of the collar 78 engages with the slanted outer surface 82 of the outer tube 72. With sufficient turning force applied to the collar 78, a frictional engagement force arises between a portion of the collar 78 and a portion of the outer surface 82 of the outer tube 72. This engagement inhibits subsequent pivoting of the tubes 72 and 56 about their point of connection to the said such further part 42. The pair of screwthreads of the tube 56 and outer tube 72 and the pair of screwthreads of sleeve 10 and the collar 78 are preferably selected to be opposed, i.e. one of the pairs is "left-handed" and the other pair is "right-handed", or vice-versa (although convention dictates that the pair of screwthreads of the tube 56 and the outer tube 72 are "right-handed"), so that a rotation of the tube 56 relative to the outer tube 72 will tend to tighten engagement between the screwthreads of the other pair of parts to mitigate any loosening of screwthreaded attachments.

Thus, a strong connection is formed between the tube 56, the outer tube 72 and cylindrical sleeve 10 which, once formed is very unlikely to become undone in service.

The connection assembly 100 is in engagement with a further part 42 as described above with reference to FIG. 10.

Figure 16:
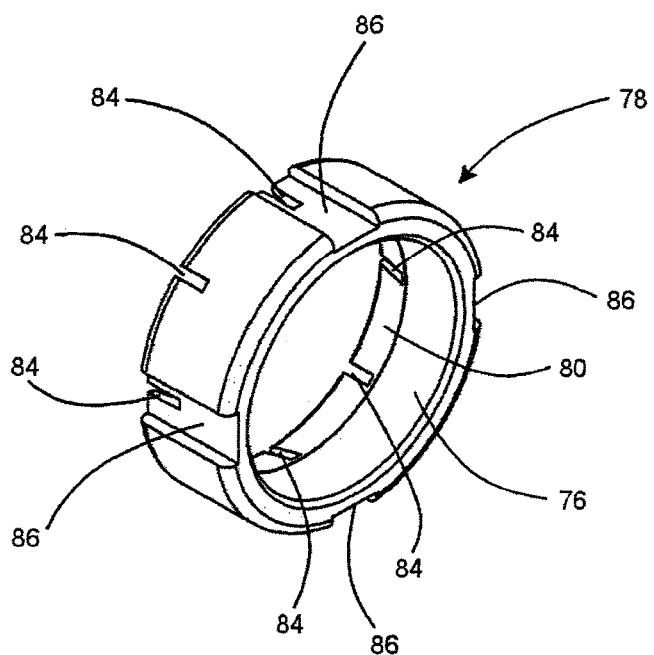
FIG. 16 shows a perspective view from one side of a collar of the connection assembly of FIG. 15.

Referring now to FIG. 16, an alternative construction for the collar 78 of a connection assembly embodying the second aspect of the present invention has a first portion with an inner surface 76 and a second portion with an inner surface 80. The inner surface 80 of the second portion is flared in a direction away from the portion with the inner surface 76, its smallest internal cross-section being larger than the uniform internal cross-section of the first portion. The surface 80 engages a corresponding slanted outer surface 82 provided on an outer tube 72 (not shown in FIG. 16, but shown in FIG. 17). The second portion of the collar 78 has axially extending slots 84 opening onto one end of the collar 78, which slots enable the second portion of the collar 78 to be resiliently deformable under the exertion of a force between the collar 78 and the outer tube 72.

The collar 78 also has indents 86 in its outer surface for engagement with a suitable tool (not shown).

Figure 17:
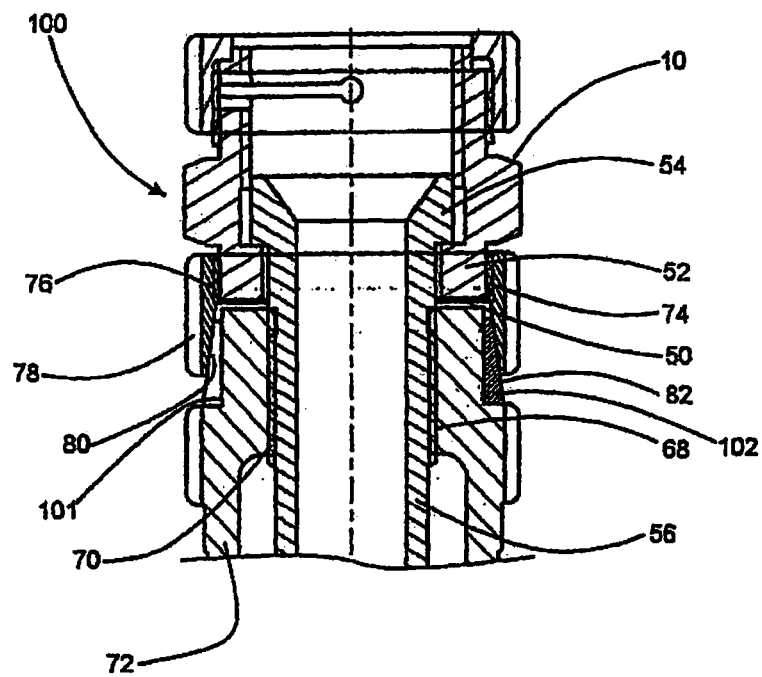
FIG. 17 shows an axial section of a further embodiment of a connection assembly in accordance with the second aspect of the present invention.
Figure 18:
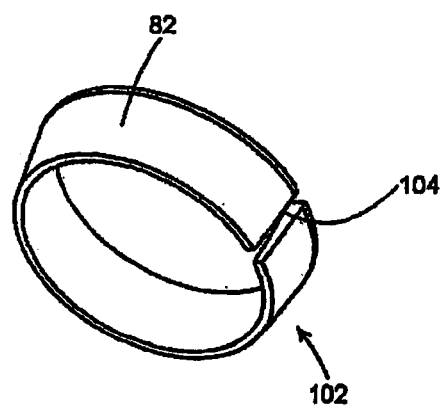
FIG. 18 shows a perspective view from one end of a removable ring of the connection assembly of FIG. 17.

The connection assembly 100 shown in FIG. 17 differs from that shown in FIG. 15, only in that the collar 78 is as shown in FIG. 16, but without the slots 84, the outer surface of the end of the outer tube 72 is stepped to provide an end portion 101 of smaller external cross-sectional diameter than the remainder of the tube 72, and the slanting surface 82 is provided by a split ring 102 shown in FIG. 12 which surrounds the portion 101.

In the construction of the connection assembly shown in FIG. 17, however, as the collar 78 is turned, the inner slanting surface 80 of the collar 78 engages with the slanted outer surface 82 of the ring 102. With sufficient turning force applied to the collar 78, a frictional engagement force is formed between the inner surface 80 of the collar 78 and the outer surface 82 of the ring 102.

Numerous modifications and variations to the illustrated embodiments may occur to the reader without taking the resulting construction outside the scope of the present invention. For example, instead of having slots 18, those slots may instead be thinned regions of the sleeve which crumple upon tightening of the locking ring 30 on the sleeve 10. The outer tube 72 may be connected to the tube 56 by, for example, swaging, or by an interference fit, instead of by way of the illustrated screwthread on the outer surface 68 in the embodiments illustrated in FIGS. 10, 15 and 17.

The invention claimed is:

1. A connector comprising a cylindrical sleeve device having a first part with an external screwthread on its outer side, and a second part with an internal screwthread on its inner side, the internal screwthread on the inner side of the said second part engaging a corresponding screwthread on a further part when the connector is in use, at least a portion of the said second part being yieldable, the connector further comprising a locking part provided with a screwthread which engages the external screwthread on the outer side of the said first part when the connector is in use, the said second part and the locking part having mutually engageable portions which, when the locking part is tightened relative to the cylindrical sleeve device, interengage to cause yielding of the second part or the yieldable portion thereof and so effect locking of the cylindrical sleeve device with respect to such a further part when the connector is in use, wherein the connector has a tubular part having an end which is held between the said further part and a shoulder on the inner surface of the said second part so that the end of the said tubular part and the said further part are in a sealed relationship.

2. A connector according to claim 1, wherein the first part and the second part are formed of a single integral component.

3. A connector according to claim 1, wherein the first part and the second part are separable parts.

4. A connector according to claim 3, wherein the first and second parts are provided with mutually engageable portions.

5. A connector according to claim 3, wherein the first part and second parts have corresponding tapered or chamfered surfaces.

6. A connector according to claim 1, wherein the screwthreads of the first part and the locking part which interengage are oppositely handed to the screwthreads of the second part and the said further part which interengage.

7. A connector according to claim 1, wherein the second part is provided with one or more slots.

8. A connector according to claim 7, wherein the slot or slots are substantially parallel to an axis of the second part.

9. A connector according to claim 8, there being a plurality of slots distributed equiangularly.

10. A connector according to claim 7, wherein the slot or slots are substantially perpendicular to an axis of the second part.

11. A connector according to claim 7, wherein the slot is provided along substantially the full length of the second part.

12. A connector according to claim 1, wherein the second part and the locking part have corresponding tapered surfaces.

13. A connector according to claim 1, wherein the locking part is a ring or hollow cylindrical portion.

14. A connector according to claim 1, wherein the locking part is provided with an inwardly directed lip or shoulder.

* * * * *